United States Patent [19]
Nakamura

[11] Patent Number: 5,373,194
[45] Date of Patent: Dec. 13, 1994

[54] REACTIVE POWER CONTROL SYSTEM

[75] Inventor: Koji Nakamura, Tokyo, Japan

[73] Assignee: Kabushiki Kaisha Toshiba, Kawasaki, Japan

[21] Appl. No.: 894,647

[22] Filed: Jun. 5, 1992

[30] Foreign Application Priority Data

Jun. 7, 1991 [JP] Japan .................. 3-136447

[51] Int. Cl.$^5$ .................................... H02J 3/18
[52] U.S. Cl. ............................ 307/31; 307/11; 307/42
[58] Field of Search .................. 361/86, 87, 88, 93; 307/11, 12, 31, 36, 37, 38, 39, 42

[56] References Cited

U.S. PATENT DOCUMENTS 4,677,535 6/1987 Kawabata et al. ............... 363/65
4,794,316 12/1988 Uchino et al. .................. 322/47
5,047,909 9/1991 Hosada ............................ 363/40

Primary Examiner—Jeffrey A. Gaffin
Attorney, Agent, or Firm—Oblon, Spivak, McClelland, Maier & Neustadt

[57] ABSTRACT

A system for controlling reactive power generated in a power, the power system having a power source system, a plurality of load units, each of the load systems, including a cyclic current type cycloconverter system, connected to the power source and a plurality of condenser systems. The system includes a voltage detection unit for detecting a voltage of power supplied from the power source, a current detection unit for detecting a current of the power supplied from the power source, a main control unit for detecting reactive power of the power supplied from the power source and for generating a control signal to control the reactive power generated in the power system, and a plurality of circulating current control units installed in each of the load units, responsive to the control signal generated from the main control unit, for controlling each of the circulating current type cycloconverter systems corresponding to the each of the load units to adjust the reactive power generated in the power system.

5 Claims, 7 Drawing Sheets

REACTIVE POWER CONTROL SYSTEM

BACKGROUND OF THE INVENTION

1. Field of the Invention

This invention relates to a reactive power control system, and more particularly to a reactive power control system using a plurality of cycloconverters.

2. Discussion of the Background

Reactive power compensation units and condenser units are generally known as units for improving the reactive power of power systems. However, a circulating current type cyclo-converter does not require these reactive power compensation units, and the reactive power can be controlled by controlling the circulating current independently of the load current of the cyclo-converter. In other words, the reactive power generation due to the load current when the load current is small is small, and the reactive power of the cyclo-converter itself can be controlled at a constant by passing a circulating current increased by the amount required. The power factor of the power system is always maintained at a high level and voltage fluctuation of the power system is cancelled out by installing a condenser unit having a leading capacity equivalent to the lagging reactive power generated by the cyclo-converter and using it to cancel out the lagging reactive power of the cyclo-converter. Thus, it is the circulating current type cyclo-converter which achieves a stable voltage power system without voltage fluctuation of the power system.

FIG. 1 shows an example in which this type of conventional circulating current type cyclo-converter is connected to a power system. When considering a rolling mill facility as the load connected to the cyclocon- verter, there are many cases in which 5 to 8 cyclo-converters and 3 to 5 condensers are provided.

In FIG. 1, n sets of load systems are connected to power source B. FIG. 1 shows only the first load unit and the nth load unit. In the first load system, controlled power is supplied to the load, for instance motor M1, from receiving point R of power system B via circuit-breaker CB1, transformer T1 and circulating current type cyclo-converter (hereinafter simply referred to as cyclo-converter) CONV1. In the same way, controlled power is supplied to motor Mn from power source B via circuit-breaker CBn, transformer Tn and cyclo-converter unit CONVn. Cyclo-converter units CONV1 and CONVn each consist of a cyclo-converter 10 directly connected to its respective load and the control unit (numerals 11 to 15) which controls it.

Also, m sets of condenser units are connected to power source B for compensating lagging reactive power of the load. Here also, only the first condenser unit and the mth condenser are shown. The first condenser unit is composed of circuit-breaker CBC1 and condenser SC1, and the mth condenser unit is composed of circuit-breaker CBCm and condenser SCm. Incidentally, a reactor is shown as connected in series with the condenser. This is used for adjusting the capacity of the condenser in the form of cancelling-out, and the two together are treated as the condenser.

The voltage at receiving point R is detected by voltage sensor PT1, and this detected voltage is conducted to each cyclo-converter unit CONV1 and CONVn. The load current of each load unit is detected by current sensors CT1 to CTn and is conducted to the controller of the cyclo-converter unit to which the current sensor concerned is dedicated. This controller is provided in each cyclo-converter unit, but FIG. 1 only shows the controller in first cyclo-converter unit CONV1. However, a controller with the same composition is provided in each cyclo-converter unit.

In cycloconverter unit CONV1, the reactive power is detected by reactive power detection device 11 based on the detected voltage and detected current which are conducted. The circulating current of cyclo-converter 10 is controlled by reactive power control device 12 based on the reactive power detected by reactive power detection device 11 via circulating current control device 13 and gate control device 15 so that it becomes a pre-set reactive power value. In the controller, load current control device 14 is provided independent of circulating current control device 13 for controlling the load current flowing in motor M1.

In the conventional circulating current type cyclo-converter unit described above, a condenser unit is provided which can supply leading reactive power equivalent to the maximum lagging reactive power generated by cyclo-converter 10. Therefore, when all the cyclo-converter units and all the condenser units are connected, the lagging reactive power of all the load units and the leading reactive power of all the condenser units cancel out and are neutralised so that no specific problems should arise.

However, in the operation of rolling facilities which are connected as the load, there are cases, called dummy rolling, when rolling is operated by shutting down at least one of the n rolling facilities depending on the rolling material, or cases of operation by separating-off a part of the rolling facilities due to the breakdown of cyclo-converters or condensers. In such cases, in a conventional cyclo-converter unit, the design is that the reactive power of each cyclo-converter is detected on the assumption that all loads are being operated, and each cyclo-converter is individually controlled based on the result of this detection. Therefore, when there is a variation in the load condition, such as a partial shut-down of the load as described above, optimal reactive power control cannot be performed. Thus, a problem will occur due to the increase of voltage fluctuation in the power system.

The above problem can be solved by altering the reactive power constant control settings of the cyclo-converters in each case according to the load conditions. However, not only does this require a great deal of work in practice, but also the shut-down times of the rolling facility become more frequent, thus leading to a fall in productivity.

In the case of the leading reactive power being too great, the transformers become over-excited due to the increase of the power voltage, and there is a risk of causing a temperature rise. Also, when the lagging reactive power is too great, the power voltage drops and, at the same time, the power factor also decreases. Therefore, there is an overload state due to the large power current flowing, and this becomes a cause of temperature rises in the cables.

SUMMARY OF THE INVENTION

It is an object of the invention to realize an improved control of reactive power generated in a power system.

Another object is to make it possible to keep a stable voltage in a power system.

The foregoing objects are achieved according to the present invention by providing a system for controlling reactive power generated in a power system, the power system having a power source system, a plurality of load systems, each of the load systems including a circulating current type cycloconverter system, connected to the power source system and a plurality of condenser systems. The system includes voltage detection means for detecting a voltage of power supplied from the power source system; current detection means for detecting a current of the power supplied from the power source system; main control means for detecting reactive power of the power supplied from the power source system based on the detected voltage and the detected current of the power and for generating a control signal to control the reactive power generated in the power system; and a plurality of the circulating current control means installed in each of the load systems, responsive to the control signal generated from the main control means, for controlling each of the circulating current type cycloconverter systems corresponding to the each of the load systems to adjust the reactive power generated in the power system.

According to another aspect of the present invention, the above objects are achieved by providing a method of controlling reactive power generated in a power system, the power system having a power source system, a plurality of load systems, each of the load systems including a circulating current type cycloconverter system, connected to the power source system and a plurality of condenser systems, comprising the steps of; detecting a voltage of power supplied from the power source system; detecting a current of the power supplied from the power source system; detecting reactive power of the power supplied from power source system; generating a control signal to control the reactive power generated in the power system; and controlling each of the circulating current type cycloconverter system corresponding to the each of the load systems, in response to the control signal, to adjust the reative power generated in the power system.

DETAILED DESCRIPTION OF THE PREFERRED EMBODIMENTS

The following is a detailed description of this invention with reference to the drawings.

Figure 1:
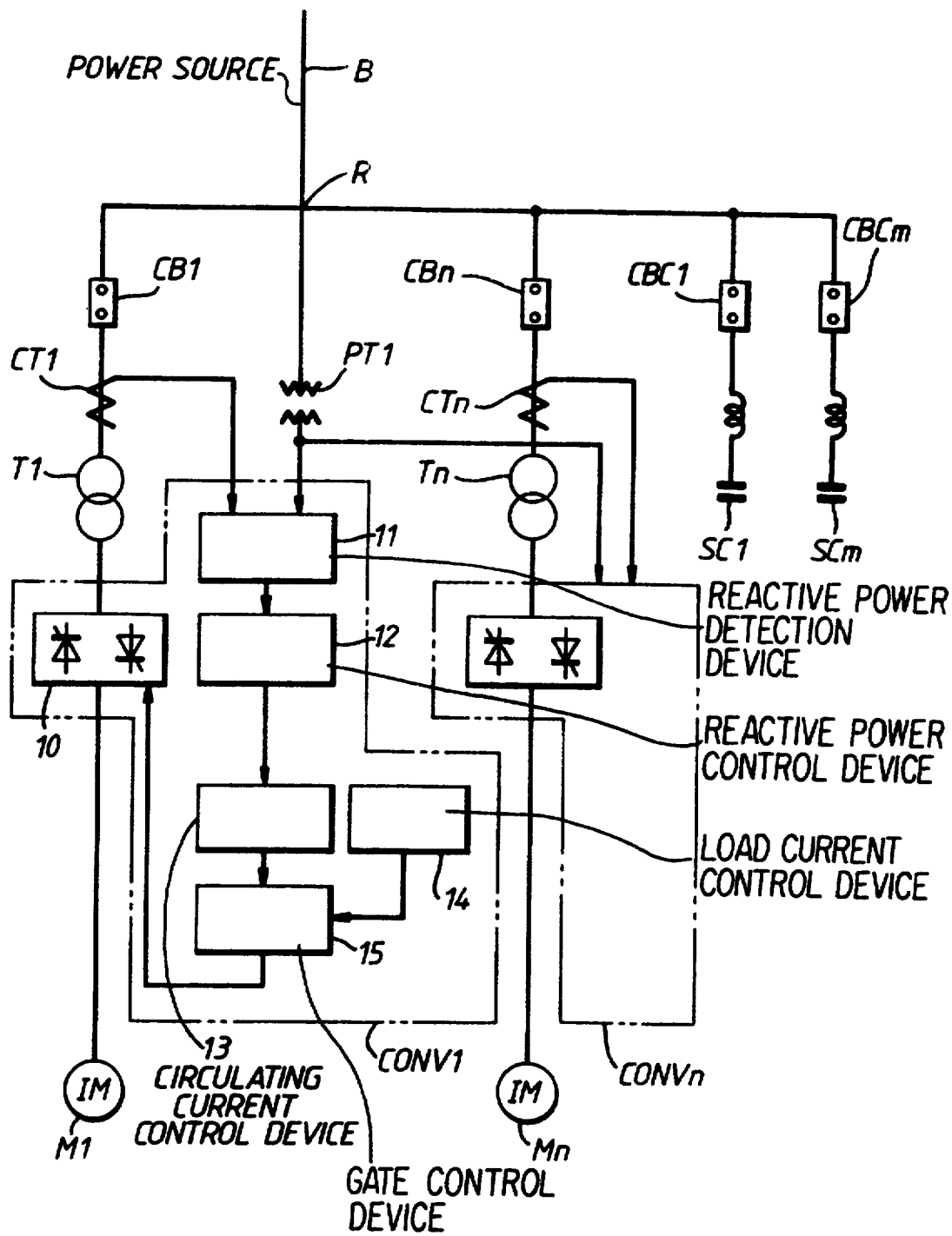
FIG. 1 is a block diagram showing a conventional reactive power control system.
Figure 2:
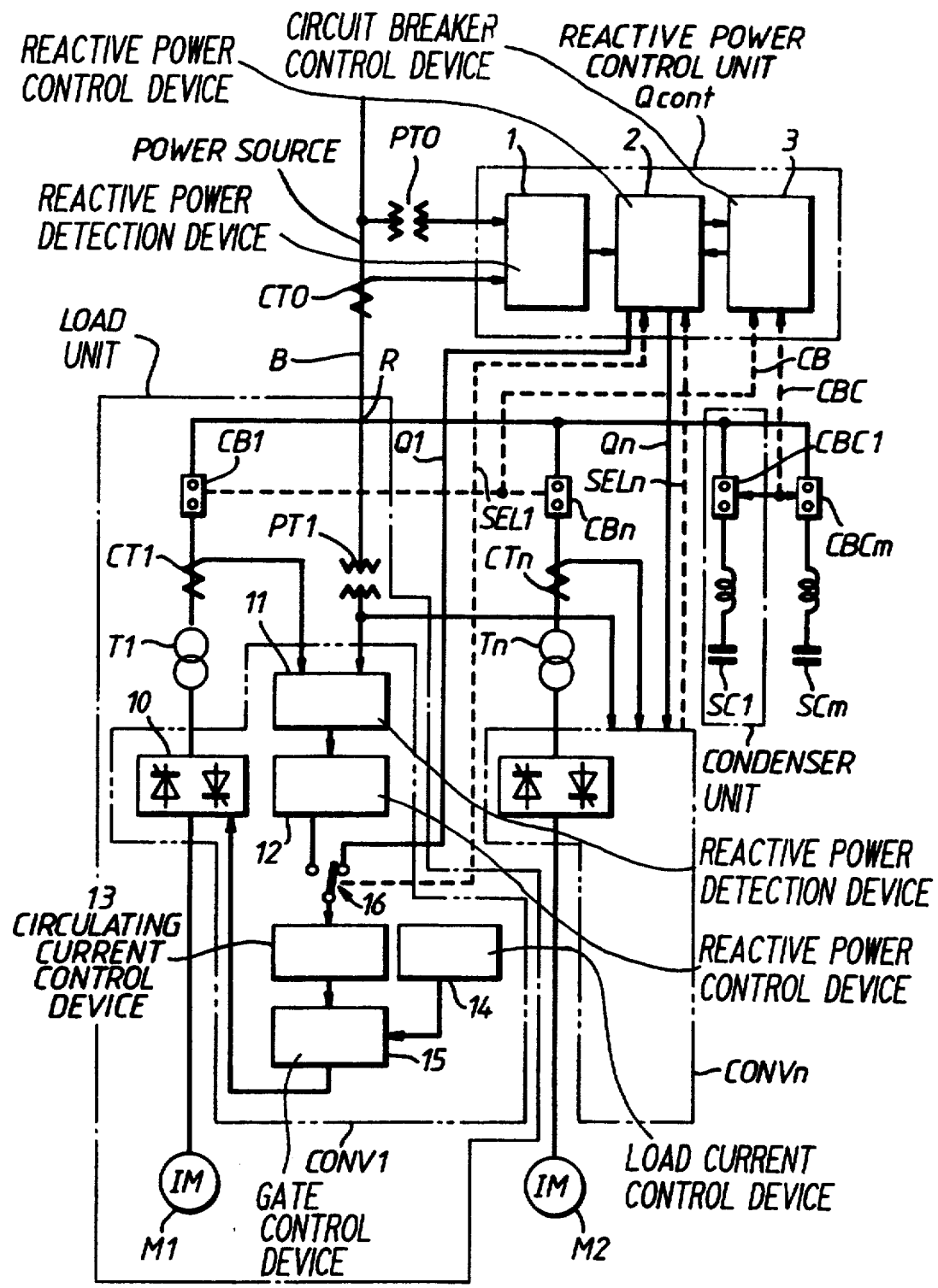
FIG. 2 is a block diagram showing a reactive power control system according to the invention.

FIG. 2 shows a reactive power control system constructed according to an embodiment of this invention. The construction of the power system in FIG. 2 is the same as that in FIG. 1. The unit in FIG. 2 is almost equivalent to the unit in FIG. 1 with the addition of voltage sensor PTO which detects the voltage at receiving point R, current sensor CTO which detects the current at receiving point R (power source system B) and reactive power control unit Qcont which executes reactive power control of the whole power system and ON/OFF control of each circuit-breaker based on the detection results of these sensors. Here, the meaning of 'almost' is as follows. Selector switch 16, for selecting either a cyclo-converter itself executing a single-system test on cyclo-converter units CONV1 to CONVn or executing rolling operation, is positioned between reactive power control device 12 and circulating current control device 13. Control selection signals SEL1 to SELn are inputted to reactive power control unit Qcont and, at the same time, reactive power controlled variables Q1 to Qn are inputted to cyclo-converter units CONV1 to CONVn, when selector switch 16 is switched to the rolling operation side (the state when circulating current control device 13 is not connected to the reactive power control device 12 side).

Cyclo-converter circuit-breaker signal CB indicates the ON/OFF state of circuit-breakers CB1 to CBn which are in series with each cyclo-converter 10. Leading capacitor circuit-breaker signal CBC is the signal for ON/OFF operation and indicates the ON/OFF state of leading capacitor circuit-breakers CBC1 to CBCm which are in series with condensers SC1 to SCm. These two signals are also inputted to reactive power control unit Qcont.

Reactive power control unit Qcont detects the reactive power at receiving point R, that is to say, of the power system as a whole, by reactive power detection device 1 based on the detection results of voltage sensor PT0 and current sensor CT0 which are connected to receiving point R, and supplies the result to reactive power control device 2. Signals indicating the ON/OFF states of each circuit-breaker, which are discriminated by circuit-breaker control device 3 are also supplied to reactive power control device 2. These are based on cyclo-converter circuit-breaker signal CB and leading capacitor circuit-breaker signal CBC. Reactive power control device 2 selects the cyclo-converter units which supply reactive power controlled variables Q1 and Qn based on control selection signals SEL1 and SELn of cyclo-converter units CONV1 and CONVn. At the same time, reactive power control device 2 calculates reactive power controlled variables Q1 and Qn corresponding to the rated capacities of each cyclo-converter unit by the signals inputted from reactive power detection device 1 and circuit-breaker control device 3. Then, these are supplied to the respective cyclo-converter units CONV1 and CONVn as reactive power commands.

Also, when the leading reactive power exceeds the specified limiting value, reactive power control device 2 supplies a signal to that effect to circuit-breaker control device 3. Due to the signal to the effect that the leading reactive power has exceeded the limiting value, circuit-breaker control device 3 outputs leading capacitor circuit-breaker signal CBC and selectively opens leading capacitor circuit-breakers CBC1 and CBCm. Moreover, when the lagging reactive power exceeds the limiting value and, at the same time, there is a leading capacitor which is not yet switched in, circuit-breaker control device 3 outputs leading capacitor circuit-breaker signal CBC in order to selectively switch it in.

The design is that the rated capacities of the cyclo-converters corresponding to circuit-breakers CB1 to CBn, the condensers corresponding to circuit-breaker CB1 to CBm, the reference reactive power controlled variable which should be controlled at receiving point R and the limiting values of the leading reactive power and the lagging reactive power are inputted and stored in reactive power control unit Qcont beforehand.

The operation of the reactive power control unit constructed as described above, is explained with reference to the flow-charts in FIGS. 3 to 7.

Figure 3:
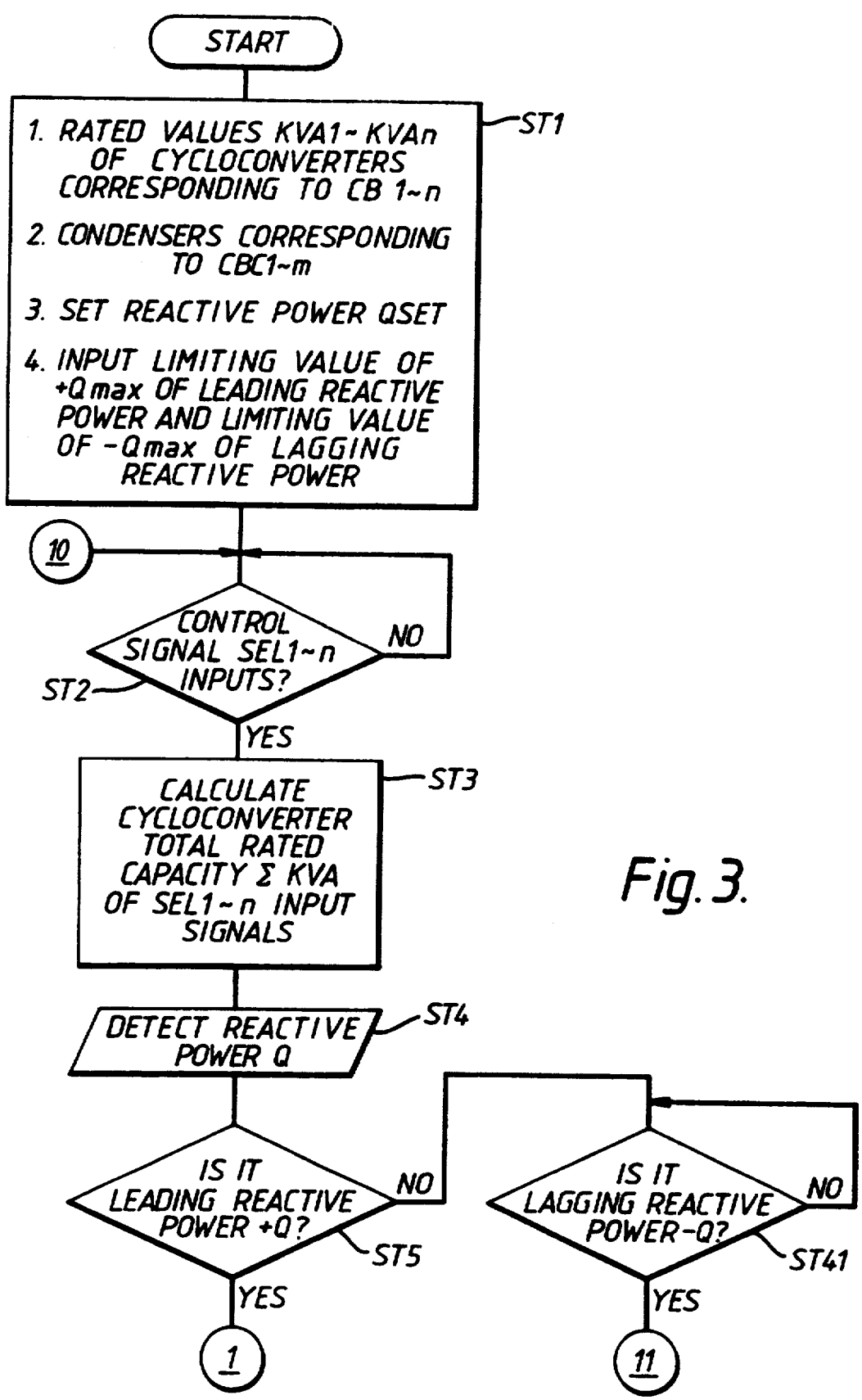
FIG. 3 is a flow-chart showing a portion of the process sequence for the reactive power control system shown in FIG. 2.

In FIG. 3, the following are input and stored beforehand in a ROM or the like:

rated capacities kVA1 and kVAn of cylco-converters corresponding to circuit-breakers CB1 and CBn;

rated capacities of the condensers corresponding to circuit-breakers CBC1 and CBCm;

set reactive power Qset which controls the reactive power of the entire power system at receiving point R;

limiting value $+Q_{max}$ of the leading reactive power for selectively releasing the condensers; and limiting value $-Q_{max}$ of the lagging reactive power for switching in condensers which are in the released state (Step ST1).

When there are input signals of control selection signals SEL1 to SELn, this signifies the presence of cyclo-converters to be controlled and reactive power control starts (Step ST2).

First, calculate the total rated capacity $\Sigma$ kVA of the cyclo-converters corresponding to the input signals of control selection signals SEL1 to SELn (Step ST3). Next, detect reactive power Q of receiving point R by reactive power detector device 1 (Step ST4). Then, judge whether or not reactive power Q which has been detected is leading reactive power $+Q$ (step ST5). If it is leading reactive power $+Q$, proceed to the process flow in FIG. 4. If this is not the case, judge whether or not it is lagging reactive power $-Q$, and if "YES", proceed to the process flow in FIG. 6 (Step ST41). If the reactive power is neither leading nor lagging, this signifies that the power factor of the power system is 1, and this is the optimum state.

Figure 4:
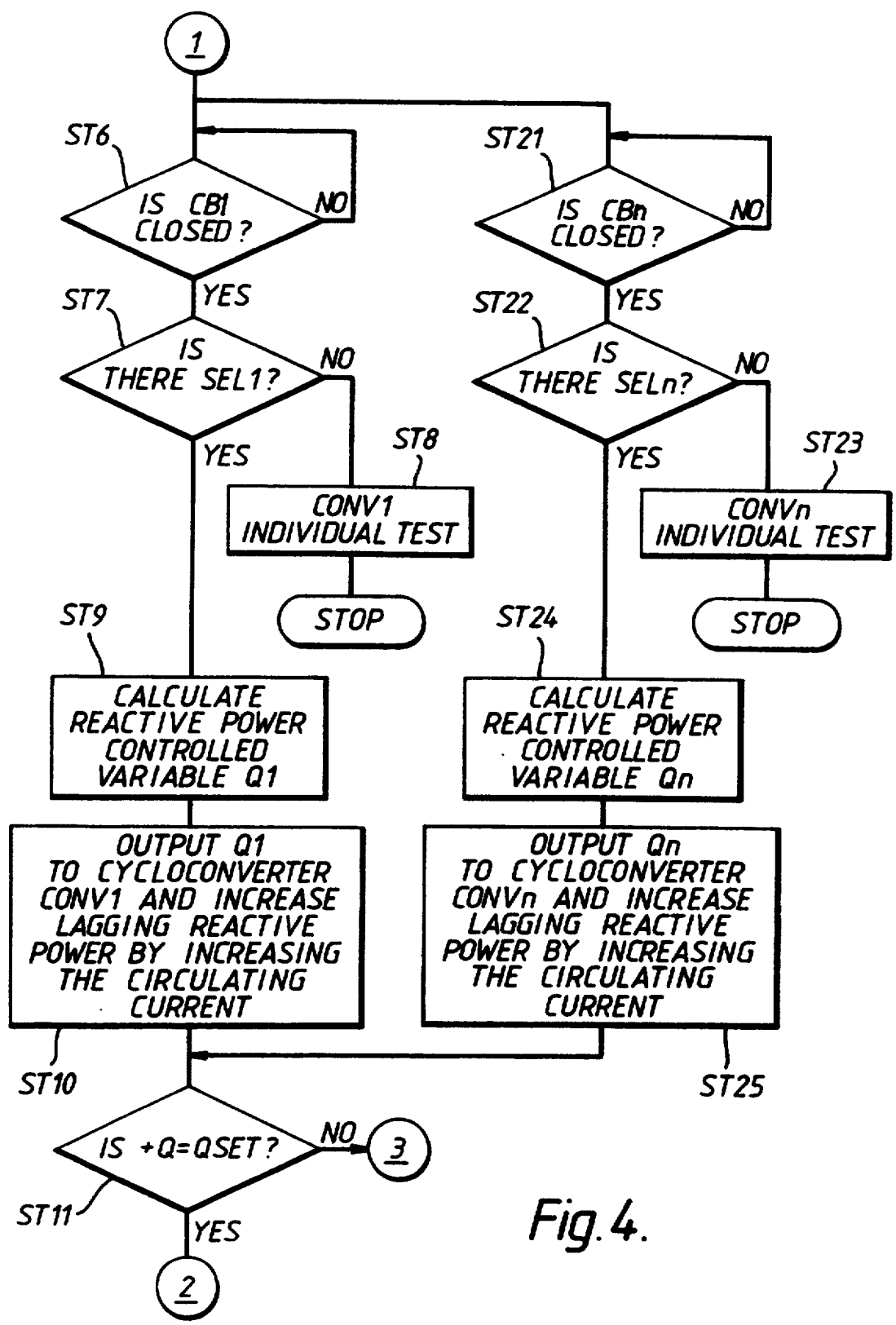
FIG. 4 is a flow-chart showing a portion of the process sequence for the reactive power control system shown in FIG. 2.

In the process flow in FIG. 4, first judge whether or not circuit-breaker CB1 is closed (Step ST6), and if circuit-breaker CB1 is closed, next judge whether or not there is an input of control selection signal SEL1 (Step ST7). If there is no input of control selection signal SEL1, treat cyclo-converter unit CONV1 as under single unit test or in the resting state and eliminate it as a subject for control (Step ST8). If there is an input of control selection signal SEL1, calculate the reactive power controlled variable Q1 of cyclo-converter unit CONV1 by Q1 = $+Q \cdot kVA/\Sigma$ kVA (Step ST9). This equation computes how great a share of lagging reactive power to generate for rated capacity $\Sigma$ kVA of all the cyclo-converters during rolling facility operation and for leading reactive power $+Q$ detected as cyclo-converter unit CONV1. Output reactive power controlled variable Q1 of the computed result to circulating current control device 13 of cyclo-converter unit CONV1 from reactive power control device 2, and increase the generation of lagging reactive power (Step ST10).

At the same time, judge whether or not circuit-breaker CBn is closed in the same way for reactive power controlled variable Qn of cyclo-converter unit CONVn (Step ST21), and if circuit-breaker CBn is closed, next judge whether or not there is an input of control selection signal SELn (Step ST22). If there is no input of control selection signal SELn, treat cyclo-converter unit CONVn as under single unit test or in the resting state and eliminate it as a subject for control (step ST23). If there is an input of control selection signal SELn, calculate the reactive power controlled variable Qn of cyclo-converter unit CNVn by Qn = $+Q \cdot kVAn/\Sigma$ kVA (Step ST24). This equation computes how great a share of lagging reactive power of generate for rated capacity $\Sigma$ kVA of all cyclo-converters during rolling facility operation and for leading reactive power $+Q$ detected as cyclo-converter unit CONVn. Output reactive power controlled variable Qn of the computed result to circulating current control device 13 of cyclo-converter unit CONVn from reactive power control device 2, and increase the generation of lagging reactive power (Step ST25). Next, judge whether or not leading reactive power $+Q$ has become set reactive power Qset (step ST11). Then, proceed to the process flow in FIG. 5.

Figure 5:
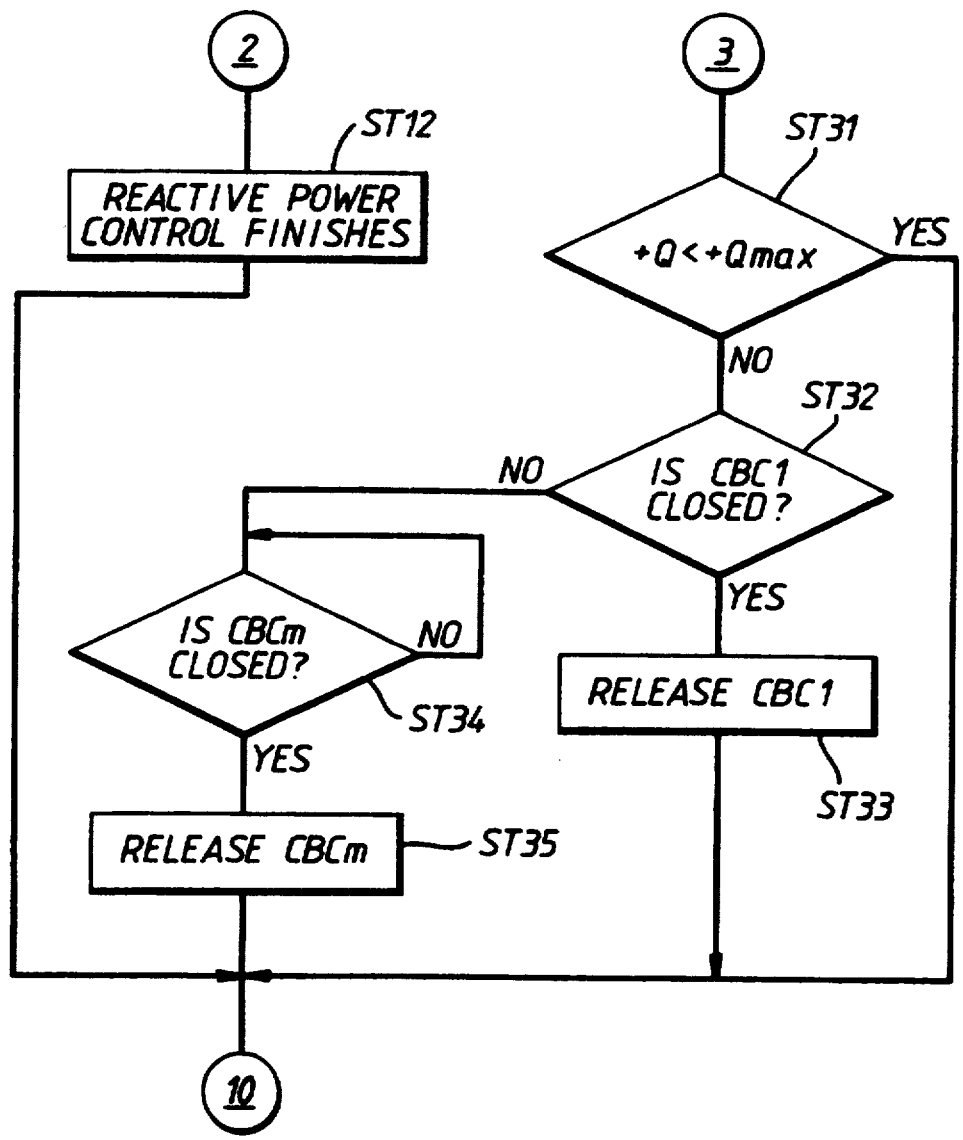
FIG. 5 is a flow-chart showing a portion of the process sequence for the reactive power control system shown in FIG. 2.

In FIG. 5, if $+Q$=Qset, there is no requirement for reactive power control, and reactive power control finishes (Step ST12). If $+Q$=Qset, make a comparative judgement of whether or not leading reactive power $+Q$ has reached leading reactive power limiting value $+Q_{max}$ (Step ST31). If $+Q < Q_{max}$, proceed to the process flow in FIG. 3. If $+Q > +Q_{max}$, this signifies that the leading capacity of the cycloconverter is greater than its reactive power control performance, and therefore, first check whether or not leading capacitor circuit-breaker CBC1 is closed (Step ST32). If this circuit-breaker CBC1 is closed, output leading capacitor circuit-breaker signal CBC from circuit-breaker control device 3 and release circuit-breaker CBC1 in order to reduce the leading reactive power (Step ST33). When the leading capacity is greater even though circuit-breaker CBC1 is released, then check whether or not circuit-breaker CBCm is switched in (Step ST34). If it is confirmed that circuit-breaker CBC1 is closed, release circuit-breaker CBCm (Step ST35). Then, proceed to the process flow in FIG. 3, and repeat the process from the initial state.

Figure 6:
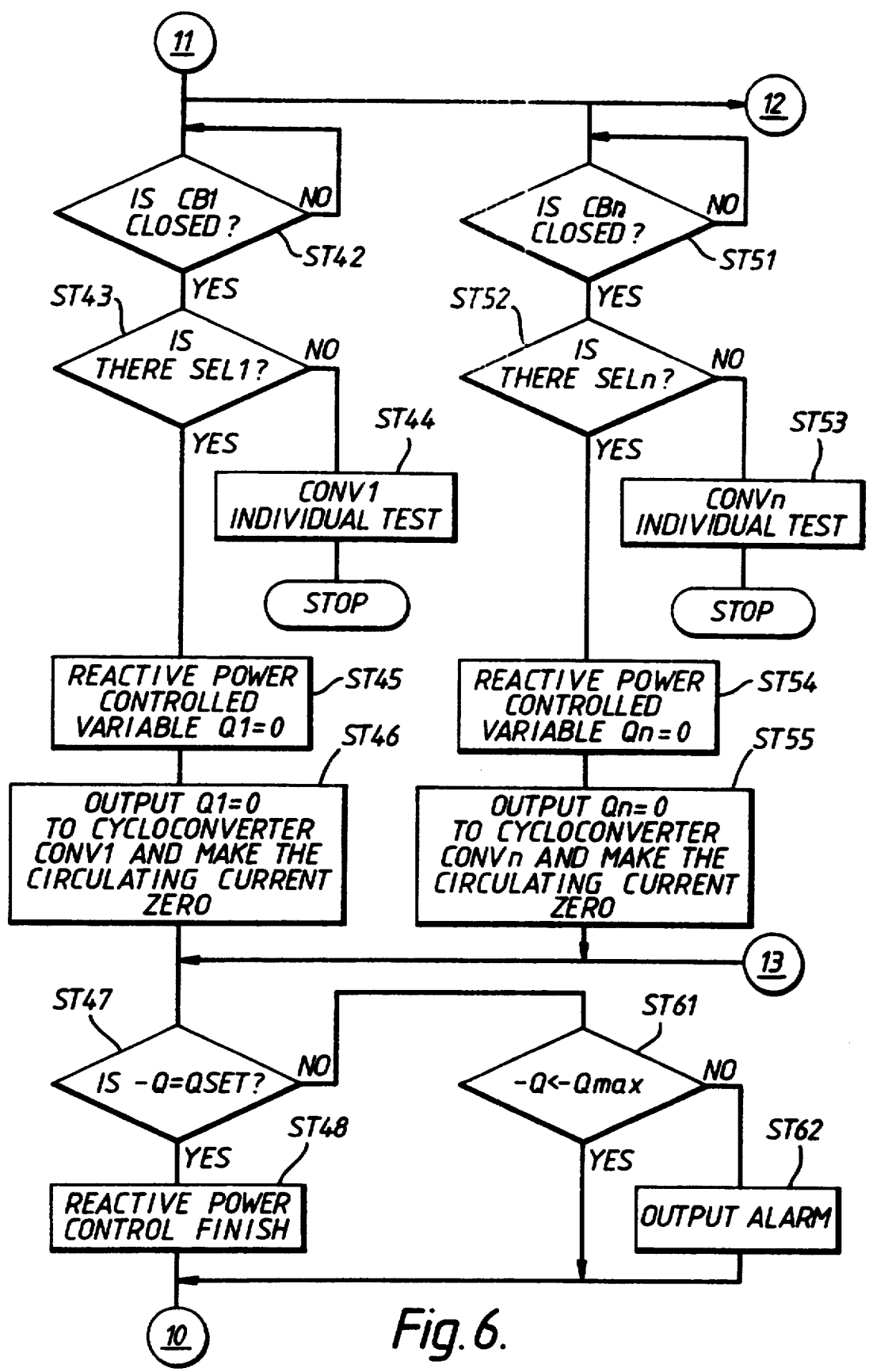
FIG. 6 is a flow-chart showing a portion of the process sequence for the reactive power control system shown in FIG. 2.

FIG. 6, shows the process flow for the case when the power system is in the lagging reactive power state. First, judge whether or not circuit-breaker CB1 is closed (Step ST42), and if circuit-breaker CB1 is closed, judge whether or not there is an input of control selection signal SEL1, (Step ST43). If there is no input of control selection signal SEL1, treat cyclo-converter unit CONV1 as under single unit test or in the resting state and eliminate it as a subject for control (Step ST44). If there is an input of control selection signal SEL1, make the reactive power controlled variable Q1 of cyclo-converter unit CONV1 zero (Step ST45). Reduce the generation of lagging reactive power by outputting the Q1=0 command to circulating current control device 13 of cyclo-converter unit CONV1 from reactive power control device 2 (Step ST46).

At the same time, in the same way, in the case of reactive power controlled variable Qn of cyclo-converter unit CONVn, first check whether or not circuit-breaker CBn is closed (step ST51), and when circuit-breaker CBn is closed, judge whether or not there is an input of control selection signal SELn (Step ST52). If there is no input of control selection signal SELn, treat cyclo-converter unit CONVn as under single unit test or in the resting state and eliminate it as a subject for control (Step ST53). If there is an input of control selection signal SELn, make the reactive power controlled variable Qn of cyclo-converter unit CONVn zero (Step ST54). Next, reduce lagging reactive power by outputting the Qn=0 command to circulating current control device 13 of cyclo-converter unit CONVn from reactive power control device 2 (Step ST55).

Then, judge whether or not lagging reactive power $-Q$ has set reactive power Qset (Step ST47). If $-Q$=Qset, reactive power control finishes (Step ST48). If $-Q$=Qset, judge whether or not lagging reactive power $-Q$ has reached lagging reactive power limiting value $-Q$max, (step ST61). If $-Q < -Q$max, execute the process flow in FIG. 3. If $-Q > -Q$max, inform the operator that there is an abnormality by outputting an alarm (Step ST62). Then, repeat the process in FIG. 3.

Figure 7:
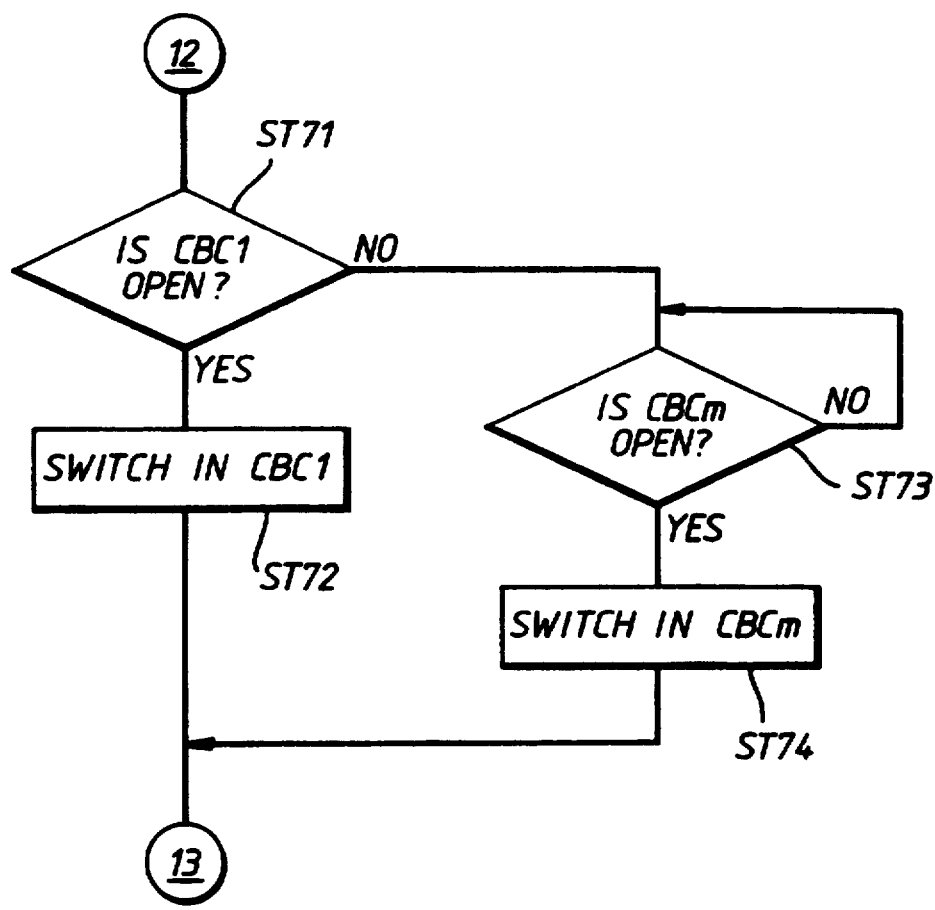
FIG. 7 is a flow-chart showing a portion of the process sequence for the reactive power control system shown in FIG. 2.

FIG. 7 shows the leading condenser switched in command state by circuit-breaker control device 3 when the power is lagging reactive power. Check whether or not leading capacitor circuit-breaker CBC1 is released when lagging reactive power $-Q$ is detected (Step ST71). When circuit-breaker CBC1 is released, switch in circuit-breaker CBC1 by outputting leading capacitor circuit-breaker signal CBC from circuit-breaker control device 3 in order to increase the leading capacity of the power system (Step ST72). Also, when the lagging reactive power is too great even though circuit-breaker CBC1 is switched in, next check whether or not circuit-breaker CBCm is released (Step ST73). When circuit-breaker CBCm is released, switch in circuit-breaker CBCm (Step ST74). Then, proceed to the process flow in FIG. 6, and execute the process from Step ST47 onward.

When using the embodiment described above, compared with the case of reactive power control only being individually carried out by each cyclo-converter unit in the prior art, since reactive power control of the whole power system is carried out at receiving point R, there is no influence on the load state. Therefore, the entire power system can be made more stable.

Reactive power control can be automatically executed for the whole power system via circulating current type cylo-converters according to the load state of the power system, without paying any particular attention to the load state. Therefore, stable power with little voltage fluctuation can be supplied to the load units.

What is claimed is:

1. A system for controlling reactive power generated in a power system, the power system having a power source, a plurality of load units, each of the load units including a circulating current type cycloconverter, connected to the power source and a plurality of condenser units, each of the condenser units including a circuit breaker and a leading condenser, serially connected to the power source, comprising:

voltage detection means for detecting a voltage at a receiving point where power is supplied from the power source;

current detection means for detecting a current at the receiving point;

main control means for detecting reactive power at the receiving point based on the detected voltage and the detected current and for generating a control signal to control generation of the reactive power in the power system; and circulating current control means installed in each of the load units, responsive to the control signal generated from the main control means, for controlling each of the circulating current type cycloconverters corresponding to the each of the load units to adjust the reactive power generated in the power system by sharing the reactive power depending on rated capacities of the cycloconverters.

2. The system of claim 1, wherein the main control means includes detection means for detecting leading reactive power at the receiving point based on the detected voltage and the detected current, control means for generating a control signal to control generation of the leading reactive power in the power system and breaker control means for controlling the condenser units to reduce the leading reactive power generated in response to the amount of the reactive power generated in the power system by releasing the circuit breaker.

3. The system of claim 1, wherein each of the plurality of the load units further includes voltage detecting means for detecting a voltage at the receiving point of the each of the load units supplied from the power source, current detecting means for detecting a current of the power supplied from the power source, adjustment means for detecting reactive power at the each of the load units based on the detected voltage and the detected current of the power of the each of the load units and for controlling the circulating current control means to reduce reactive power generated in the each of the load units, and switching means for switching connection destination of the circulating current control means from the main control means to the control means.

4. A method of controlling reactive power generated in a power system, the power system having a power source, a plurality of load units, each of the load units including a circulating current type cycloconverter, connected to the power source and a plurality of condenser units, each of the condenser units including a circuit breaker and a leading condenser, serially connected to the power source, comprising the steps of:

detecting a voltage at a receiving point where power is supplied from the power source;

detecting a current at the receiving point;

detecting reactive power at the receiving point based on the detected voltage and the detected current;

generating a control signal to control the reactive power generated in the power system; and controlling each of the circulating current type cycloconverters corresponding to the each of the load units, in response to the control signal, to adjust the reactive power generated in the power systems by sharing the reactive power depending on rated capacities of the cycloconverters.

5. The method of claim 4, wherein the step of controlling each of the circulating current type cycloconverters includes the step of controlling the condenser units to reduce leading reactive power in response to the amount of the reactive power generated in the power system by releasing the circuit breaker.

* * * * *